United States Patent
Kim

(10) Patent No.: US 7,933,631 B2
(45) Date of Patent: Apr. 26, 2011

(54) APPARATUS FOR INFORMING OF RECEPTION OF INCOMING CALL

(75) Inventor: Beum Seok Kim, Seoul (KR)

(73) Assignee: A. L. Tech, Inc., Seoul (KR)

( * ) Notice: Subject to any disclaimer, the term of this patent is extended or adjusted under 35 U.S.C. 154(b) by 671 days.

(21) Appl. No.: 12/035,626

(22) Filed: Feb. 22, 2008

(65) Prior Publication Data

US 2009/0215501 A1 Aug. 27, 2009

(51) Int. Cl.
*H04M 1/00* (2006.01)
*H04B 1/38* (2006.01)

(52) U.S. Cl. .......... 455/567; 455/569.1; 455/569.2

(58) Field of Classification Search .......... 455/567, 455/569.1, 569.2, 566, 575.1, 575.8, 575.9, 455/41.2, 41.3, 157.2, 159.1, 152.1, 344, 455/345

See application file for complete search history.

(56) References Cited

U.S. PATENT DOCUMENTS

| 4,039,894 | A  | * | 8/1977 | Gardner, III | 315/76 |
| 6,215,984 | B1 | * | 4/2001 | Figueras et al. | 455/575.7 |
| 7,738,927 | B2 | * | 6/2010 | Ogura et al. | 455/569.2 |
| 7,756,550 | B2 | * | 7/2010 | Piekarz | 455/569.1 |

* cited by examiner

*Primary Examiner* — Eugene Yun
(74) *Attorney, Agent, or Firm* — Edwards Angell Palmer & Dodge LLP; Kingsik Kim

(57) ABSTRACT

A call informing apparatus is provided. The call informing apparatus includes a call detecting unit and a call informing unit. The call detecting unit includes an external light shielding cap that shields external light, a sensing module with an optical sensor sensing light from a display panel or a call informing lamp of a portable terminal, a first controller that generates a call reception signal, and a wireless transmitter that transmits the reception signal. The call informing unit includes a wireless receiver for receiving the reception signal, a second controller for controlling an indicating lamp to emit light, and the indicating lamp. Therefore, a user can easily and visually recognize reception of an incoming call in noisy environment, or even when riding a motorcycle.

6 Claims, 3 Drawing Sheets

[FIG. 4]
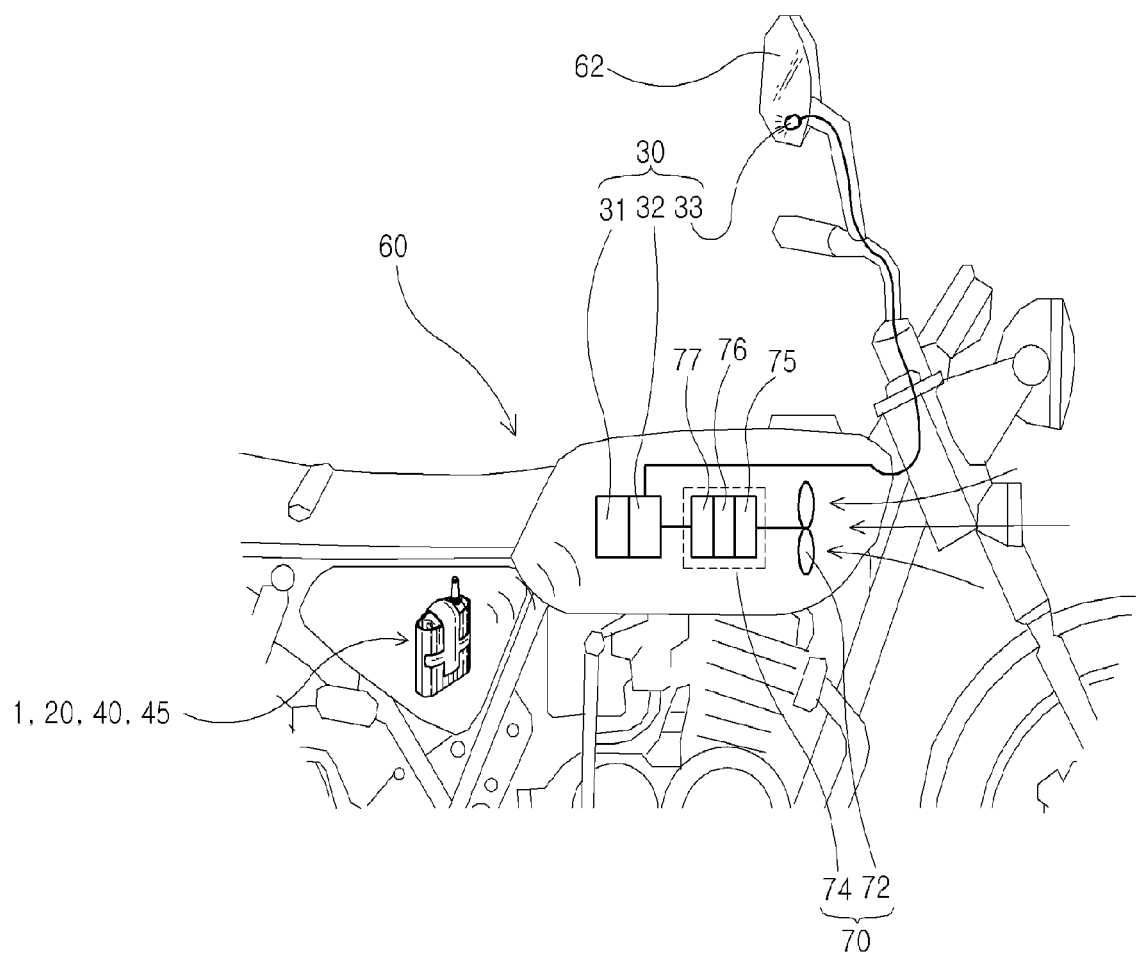

APPARATUS FOR INFORMING OF RECEPTION OF INCOMING CALL

BACKGROUND

The present disclosure relates to a call informing apparatus, and more particularly, to a call informing apparatus capable of informing a user of reception of an incoming call when it is difficult for the user to recognize the reception of the incoming call due to external environment.

A user generally carries his/her portable terminal such as a cellular phone in his/her pocket, small bag or the like. In this case, since the portable terminal is kept in such an enclosed space, the user does not hear or feel the ring tone or the vibration of the portable terminal often. Also, when a user is in a public transportation such as a subway and a bus, or a workplace exposed to noise, since the sound of the ring tone or the vibration of his/her portable terminal is drowned out by ambient noise or the user is distracted by something else, the user does not answer incoming calls frequently. Particularly, while a user is riding a motorcycle, because of wind noise, ambient noise, engine noise and vibration, it is difficult for the user to recognize the reception of an incoming call.

SUMMARY

The present disclosure provides a call informing apparatus that allows a user to easily recognize reception of an incoming call in noisy environment or when the user is doing something else.

The present disclosure also provides a call informing apparatus that can inform reception of an incoming call when a user is driving a motorcycle.

In accordance with an exemplary embodiment, a call informing apparatus for a portable terminal with a display panel or a call informing lamp that emits light when the portable terminal receives an incoming call, the call informing apparatus includes a call detecting unit and a call informing unit. The call detecting unit includes: an external light shielding cap having an opened bottom, and a periphery of the opened bottom covers or contacts the display panel or the call informing lamp of the portable terminal; a sensing module configured to generate a sensing signal and including an optical sensor installed in the external light shielding cap and configured to sense light from the display panel or the call informing lamp of the portable terminal; a first controller configured to receive the sensing signal from the sensing module, determine whether the portable terminal receives the incoming call, and generate a call reception signal upon reception of the incoming call; and a wireless transmitter connected to the first controller and configured to transmit the call reception signal. The call informing unit includes: a wireless receiver configured to receive the call reception signal from the wireless transmitter; a second controller connected to the wireless receiver and configured to control an indicating lamp to emit light; and the indicating lamp.

The call informing apparatus may further include a case configured to receive the portable terminal, and the sensing module may be installed at an inner surface of the case.

The case may include: a case body having an opening in a front thereof, the opening being configured to expose the display panel or the call informing lamp of the portable terminal; and a case cover attached to one side of the case body and configured to cover the opening of the case body, and the sensing module may be installed at a portion of the case cover which corresponds to the opening of the case body, and the sensing module may be placed on the display panel or the call informing lamp of the portable terminal.

The call informing apparatus may further include an electric power supply unit. The electric power supply unit includes: a fan installed at a part of a motorcycle to be rotated by wind force when the motorcycle is running; and an electric power generator configured to generate electric power by means of rotation force of the fan, and the electric power supply unit is installed on the motorcycle, the indicating lamp of the call informing unit may be installed at an upper fore part of the motorcycle, and the call informing unit may be supplied with necessary electric power from the electric power supply unit.

BRIEF DESCRIPTION OF THE DRAWINGS

Exemplary embodiments can be understood in more detail from the following description taken in conjunction with the accompanying drawings, in which:

FIG. 4 is a perspective view of a state in which the call informing unit of the call informing apparatus of FIG. 1 is installed on a motorcycle.

DETAILED DESCRIPTION OF EMBODIMENTS

Hereinafter, specific embodiments will be described in detail with reference to the accompanying drawings.

Figure 1:
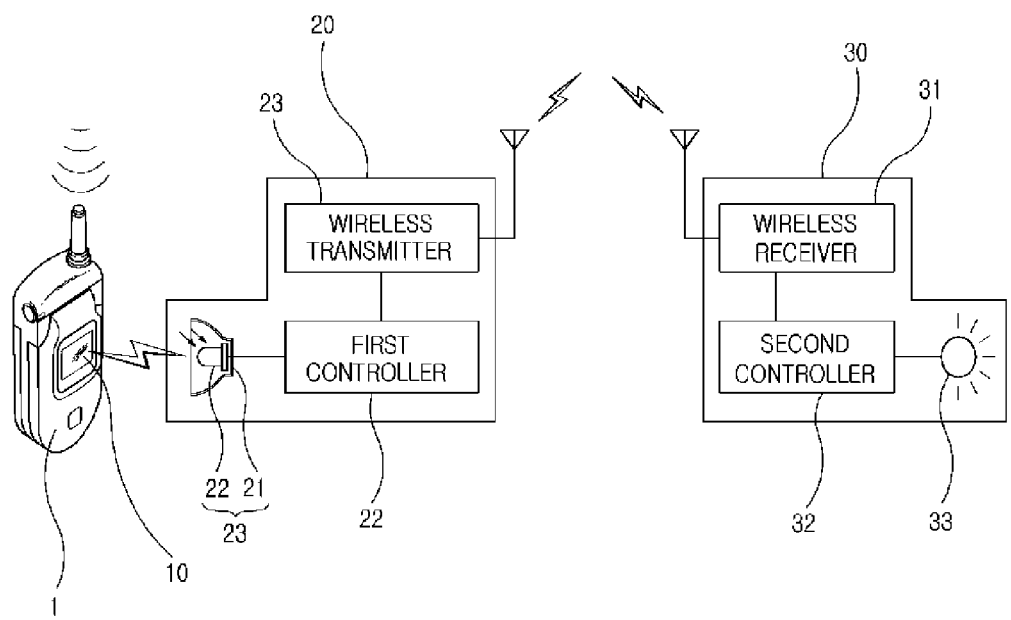
FIG. 1 is a diagram illustrating a call informing apparatus in accordance with an exemplary embodiment.

FIG. 1 is a diagram illustrating a call informing apparatus in accordance with an exemplary embodiment. Referring to FIG. 1, the call informing apparatus includes a call detecting unit 20 and a call informing unit 30. The call detecting unit 20 is placed on a display panel 10 of a portable terminal 1 such as a cellular phone in order to sense light from the display panel 10 emitting light when the portable terminal 1 receives an incoming call. The call detecting unit 20 generates and transmits a call reception signal when the portable terminal 1 receives the incoming call. Alternatively, the call informing apparatus in accordance with the exemplary embodiment may be applied to another portable terminal that has a call informing lamp, which emits light upon reception of an incoming call, instead of the display panel 10.

The call informing unit 30 receives the call reception signal from the call detecting unit 20 to inform a user of the reception of the incoming call.

The call detecting unit 20 includes an external light shielding cap 21, a sensing module 23, a first controller 24, and a wireless transmitter 26. The external light shielding cap 21 has an opened bottom. The entire periphery of the opened bottom covers or tightly contacts the display panel 10 of the portable terminal 1. The sensing module 23 includes an optical sensor 22 that is installed inside of the external light shielding cap 21 to sense light from the display panel 10. The first controller 24 is connected to the sensing module 23 to determine whether the portable terminal 1 receives an incoming call. Also the first controller 24 generates the call reception signal upon reception of an incoming call. The wireless transmitter 26 receives the call reception signal from the first controller 24 and transmits it. The optical sensor 22 may be a photo diode, a photo transistor, a cadmium sulphide (CdS) sensor, or a charged-coupled device (CCD) sensor used in a digital camera.

Figure 2:
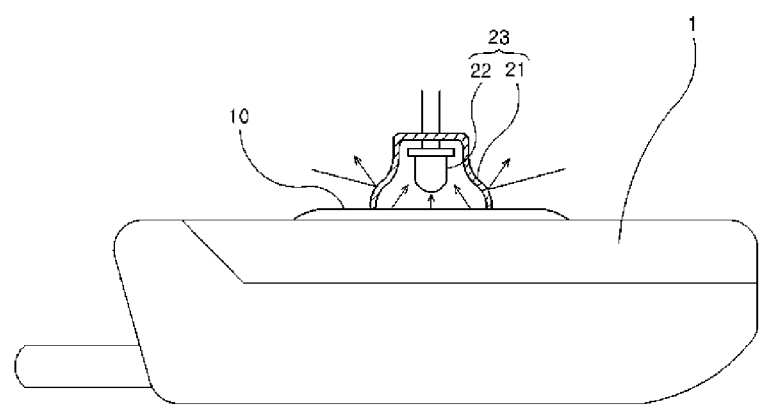
FIG. 2 is a cross-sectional view of a state in which the sensing module of the call informing apparatus of FIG. 1 is placed on the display panel of the portable terminal.

FIG. 2 is a cross-sectional view of a state in which the sensing module 23 of the call informing apparatus of FIG. 1 is placed on the display 10 of the portable terminal 1. Referring to FIG. 2, the opened bottom of the external light shielding cap 21 covers or tightly contacts the display panel 10, so that external ambient light cannot be introduced into the external light shielding cap 21 and thus the optical sensor 22 receives only light from the display panel 10, which greatly enhances accuracy when determining reception of an incoming call. In addition, the first controller 24 determines that the portable terminal 1 receives the incoming call only when it continuously receives a sensing signal from the sensing module 23 for a predetermined time interval and/or it receives a sensing signal having signal intensity higher than predetermined signal intensity. For example, when the first controller 24 continuously receives a sensing signal for less than the predetermined time interval, the first controller 24 determines that the sensing signal does not indicate reception of an incoming call and thus it dose not generate a call reception signal.

The call informing unit 30 includes a wireless receiver 31, a second controller 32, and an indicating lamp 33. The wireless receiver 31 receives the call reception signal from the wireless transmitter 26. The second controller 32 is connected to the wireless receiver 31. The indicating lamp 33 is connected to the second controller 32. The indicating lamp 33 may be a light-emitting diode (LED). When the wireless receiver 31 receives the call reception signal from the wireless transmitter 26, the second controller 32 controls the indicating lamp 33 to emit light. Through the light emitted from the indicating lamp 33, a user can know that he/she receives the incoming call. On the other hand, the call informing unit 30 may be manufactured separately from the call detecting unit 20 and attached to user's watch, accessories, small bag, or the like.

Figure 3A:
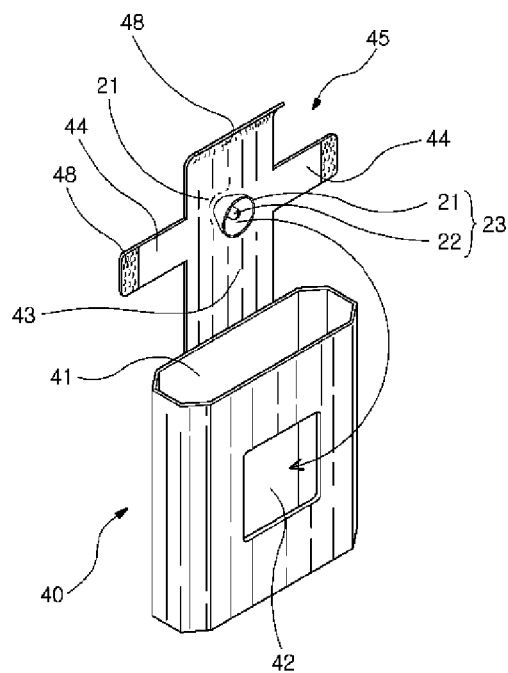
FIG. 3A is a perspective view of a state in which a case body and a case cover are assembled in accordance with an exemplary embodiment.
Figure 3B:
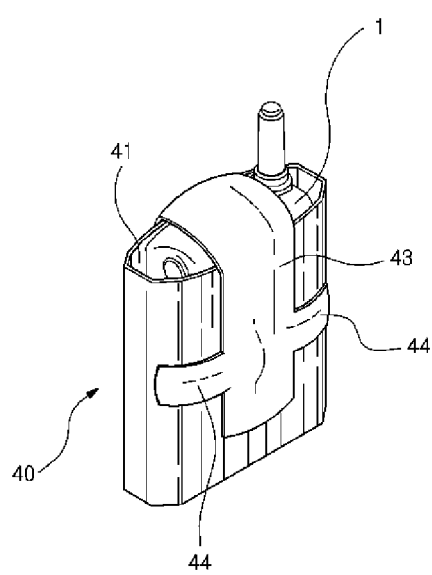
FIG. 3B is a perspective view of a state in which the portable terminal is received in the case body of FIG. 3A.

FIG. 3A is a perspective view of a state in which a case body 40 and a case cover 45 are assembled in accordance with an exemplary embodiment. FIG. 3B is a perspective view of a state in which the portable terminal 1 is received in the case body 40 of FIG. 3A. Referring to FIGS. 3A and 3B, the case body 40 for receiving the portable terminal 1 has an opened top 41 and may be formed of an elastic material to receive various size portable terminals. The case body 40 has an opening 42 in the front thereof in order to expose the display panel 10 of the portable terminal 1. In this exemplary embodiment, the display panel 10 is directly exposed to the outside through the opening 42. However, the opening 42 may be covered with a transparent film.

The case cover 45 includes a body portion 43 and two wing portions 44. The case cover 45 may be also formed of an elastic material. The case cover 45 has a crisscross shape. An end portion of the body portion 43 of the case cover 45 is attached to an upper portion of the rear of the case body 40. The body portion 43 of the case cover 45 covers a part of the opened top 41 when the case cover 45 is closed. The sensing module 23 is installed at a portion of the body portion 43 contacting the display panel 10. A hook velcro patch may be provided at the upper end of the body portion 43 and the outer ends of two wing portions 44, respectively, and a pile velcro patch may be provided at three corresponding portions of the case body 40, respectively. Accordingly, the entire periphery of the opened bottom of the external light shielding cap 21 covers or closely contacts the display panel 10, thereby shielding ambient light. As a result, the portable terminal 1 receiving the incoming call, the optical sensor 22 receives only light from the display panel 10 of the portable terminal 1. Alternatively, the case body 40 and the case cover 45 may be integrally formed as a single piece.

FIG. 4 is a perspective view of a state in which the call informing unit 30 of FIG. 1 is installed on a motorcycle 60. Referring FIG. 4, the indicating lamp 33 of the call informing unit 30 is installed at a rearview mirror 62 of the motorcycle 60. However, the installing position of the indicating lamp 33 is not limited to the rearview mirror 62. That is, the indicating lamp 33 may be installed at the instrument board of the motorcycle 60 or any position of an upper fore part of the motorcycle 60. The second controller 32 and the wireless receiver 31 of the call informing unit 30 are installed at a part of the motorcycle 60. An electric power supply unit 70 is installed on the motorcycle 60 to generate and supply electric power to the call informing unit 30. The electric power supply unit 70 includes a fan 72, an electric power generator 75, a charging circuit 76, and a rechargeable battery 77. The fan 72 is installed on the motorcycle 60 to be rotated by wind force when the motorcycle 60 is running. The electric power generator 75 is connected to the shaft of the fan 72 to generate electric power using turning force of the shaft of the fan 72. The charging circuit 76 is connected to the electric power generator 75. The rechargeable battery 77 stores the generated electric power through the charging circuit 76. As a result, the call informing unit 30 is supplied with necessary electric power from the electric power supply unit 70, so that there is no need for a separate battery.

As described above, in the call informing apparatus in accordance with the present invention, the call detecting unit 20 determines if an incoming call is received by sensing light from the display panel 10 of the portable terminal 1, and the call informing unit 30 informs a user of reception of the incoming call. Accordingly, the user can visually recognize that he/she has an incoming call when he/she cannot hear or feel the ring tone and vibration of his/her portable terminal 1 due to unfavorable external environment. Particularly, even when the portable terminal 1 is put in user's pocket or handbag, the user can easily know reception of an incoming call.

In addition, the external light shielding cap 21 shields external light, so that the optical sensor 22 senses only light from the display panel 10. Consequently, it is prevented that the call detecting unit 20 senses external light and sends a call reception signal erroneously.

Moreover, the first controller 24 of the call detecting unit 20 generates a call reception signal only when receiving a sensing signal from the sensing module 23 for the predetermined interval, thereby improving accuracy in determining reception of an incoming call.

The case body 40 having the opening 42 and the case cover 45 installed with the sensing module 23 allows the optical sensor 22 to receive only light from the display panel 10 of the portable terminal 1. This also enhances accuracy of the call detecting unit 20.

The indicating lamp 33 of the call informing unit 30 is installed at the rearview mirror 62 of the motorcycle 60, which prevents the user from missing an incoming call even when the user is riding the motorcycle 60.

The electric power supply unit 70 including the electric power generator 75 supplies electric power to the call informing unit 30, so that the indicating lamp 33 can emit light without a separate battery.

Although the call informing apparatus have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A call informing apparatus for a portable terminal with a display panel or a call informing lamp that emits light when the portable terminal receives an incoming call, the call informing apparatus comprising:
   a call detecting unit comprising:
      an external light shielding cap having an opened bottom, wherein a periphery of the opened bottom covers or contacts the display panel or the call informing lamp of the portable terminal;
      a sensing module configured to generate a sensing signal and including an optical sensor installed in the external light shielding cap and configured to sense light from the display panel or the call informing lamp of the portable terminal;
      a first controller configured to receive the sensing signal from the sensing module, determine whether the portable terminal receives the incoming call, and generate a call reception signal upon reception of the incoming call; and
      a wireless transmitter connected to the first controller and configured to transmit the call reception signal; and
   a call informing unit comprising:
      a wireless receiver configured to receive the call reception signal from the wireless transmitter;
      a second controller connected to the wireless receiver and configured to control an indicating lamp to emit light; and
      the indicating lamp.

2. The call informing apparatus of claim 1, further comprising a case configured to receive the portable terminal, wherein the sensing module is installed at an inner surface of the case.

3. The call informing apparatus of claim 2, wherein the case comprises:
   a case body having an opening in a front thereof, the opening being configured to expose the display panel or the call informing lamp of the portable terminal; and
   a case cover attached to one side of the case body and configured to cover the opening of the case body,
wherein the sensing module is installed at a portion of the case cover which corresponds to the opening of the case body, and the sensing module is placed on the display panel or the call informing lamp of the portable terminal.

4. The call informing apparatus of claim 1, further comprising an electric power supply unit comprising:
   a fan installed at a part of a motorcycle to be rotated by wind force when the motorcycle is running; and
   an electric power generator configured to generate electric power by means of rotation force of the fan,
wherein the electric power supply unit is installed on the motorcycle, the indicating lamp of the call informing unit is installed at an upper fore part of the motorcycle, and the call informing unit is supplied with necessary electric power from the electric power supply unit.

5. The call informing apparatus of claim 2, further comprising an electric power supply unit comprising:
   a fan installed at a part of a motorcycle to be rotated by wind force when the motorcycle is running; and
   an electric power generator configured to generate electric power by means of rotation force of the fan,
wherein the electric power supply unit is installed on the motorcycle, the indicating lamp of the call informing unit is installed at an upper fore part of the motorcycle, and the call informing unit is supplied with necessary electric power from the electric power supply unit.

6. The call informing apparatus of claim 3, further comprising an electric power supply unit comprising:
   a fan installed at a part of a motorcycle to be rotated by wind force when the motorcycle is running; and
   an electric power generator configured to generate electric power by means of rotation force of the fan,
wherein the electric power supply unit is installed on the motorcycle, the indicating lamp of the call informing unit is installed at an upper fore part of the motorcycle, and the call informing unit is supplied with necessary electric power from the electric power supply unit.

* * * * *